C. UEBELMESSER.
AUTOMATIC WINDING AND REVERSING MACHINE.
APPLICATION FILED MAR. 24, 1915.

1,326,997.

Patented Jan. 6, 1920.
2 SHEETS—SHEET 1.

WITNESSES:

INVENTOR
Charles Uebelmesser

C. UEBELMESSER.
AUTOMATIC WINDING AND REVERSING MACHINE.
APPLICATION FILED MAR. 24, 1915.
1,326,997.
Patented Jan. 6, 1920.
2 SHEETS—SHEET 2.
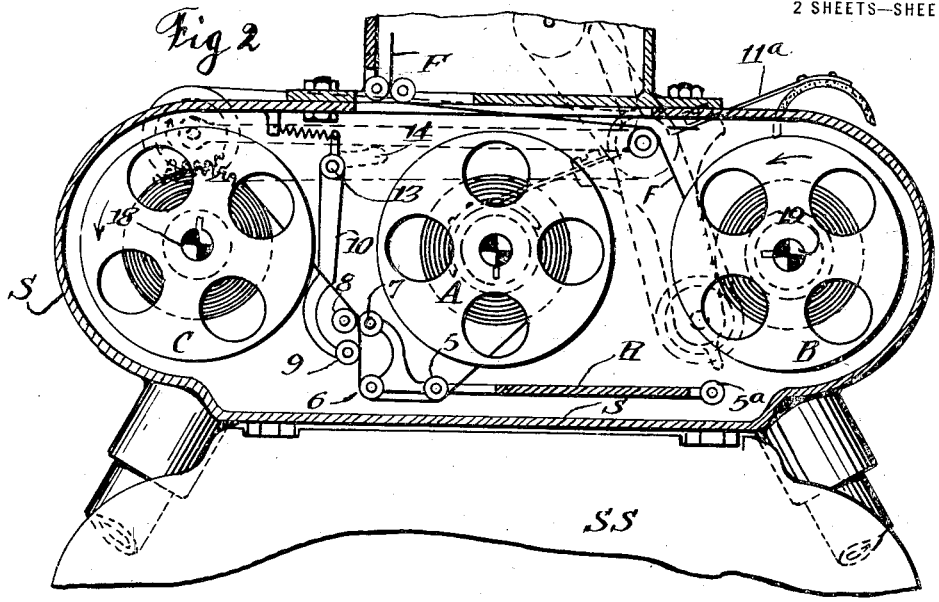
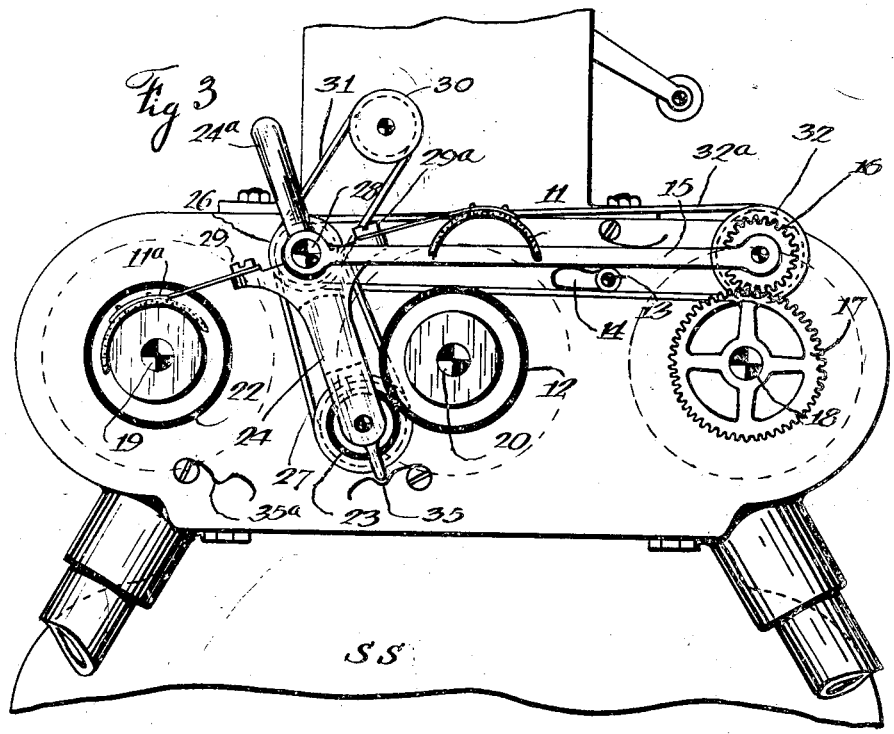
WITNESSES:
INVENTOR
Charles Uebelmesser

UNITED STATES PATENT OFFICE.

CHARLES UEBELMESSER, OF NEW YORK, N. Y., ASSIGNOR TO CRU PATENTS CORPORATION, A CORPORATION OF NEW YORK.

AUTOMATIC WINDING AND REVERSING MACHINE.

1,326,997.  Specification of Letters Patent.  Patented Jan. 6, 1920.

Application filed March 24, 1915. Serial No. 16,699.

*To all whom it may concern:*

Be it known that I, CHARLES UEBELMESSER, a subject of the Emperor of Germany, residing at New York city, county of New York, State of New York, have invented certain new and useful Improvements in Automatic Winding and Reversing Machines, of which the following is a full, clear, and exact description.

The object of my invention is to rewind a roll of film after a film has been exhibited and during the exhibition of a succeeding film, in most practical and automatic manner.

To accomplish my object, I provide a fire-proof magazine containing three reels, one of which is preferably driven at a fixed speed, and the other two frictionally and alternately. The film is received in the receptacle and wound on a frictionally driven reel. When this film has all been taken up, and a succeeding film is received and threaded on to the other frictionally driven reel, while the driving mechanism has been disengaged from the first mentioned frictionally driven reel, and is now engaging this second frictionally driven reel, the film on the first mentioned reel is threaded through a channel on to the constantly driven reel, and said directly driven reel is now receiving the film to be rewound while the exhibition and operation of the now engaged frictionally taken up film is in progress. I also provide a brake to act on the frictionally driven reel during the period of rewinding so that the film may have proper tension and be wound tight on to the final rewinding reel. The brake is thrown out of contact as soon as the driving members are engaged again to drive the reel. Brake and driving engagements are connected alternately. I also provide an automatic device to disengage the driving mechanism of the fixed speed reel and stop its motion as soon as the delivery of film thereto ceases. The film will now be in its original position on this last mentioned reel and ready to be exhibited again.

The scope of my invention will be pointed out in the claims.

In the accompanying drawings,

Fig. 2 is a side view of my device.

Fig. 3 is a rear view showing operative means in detail.

Figure 1:
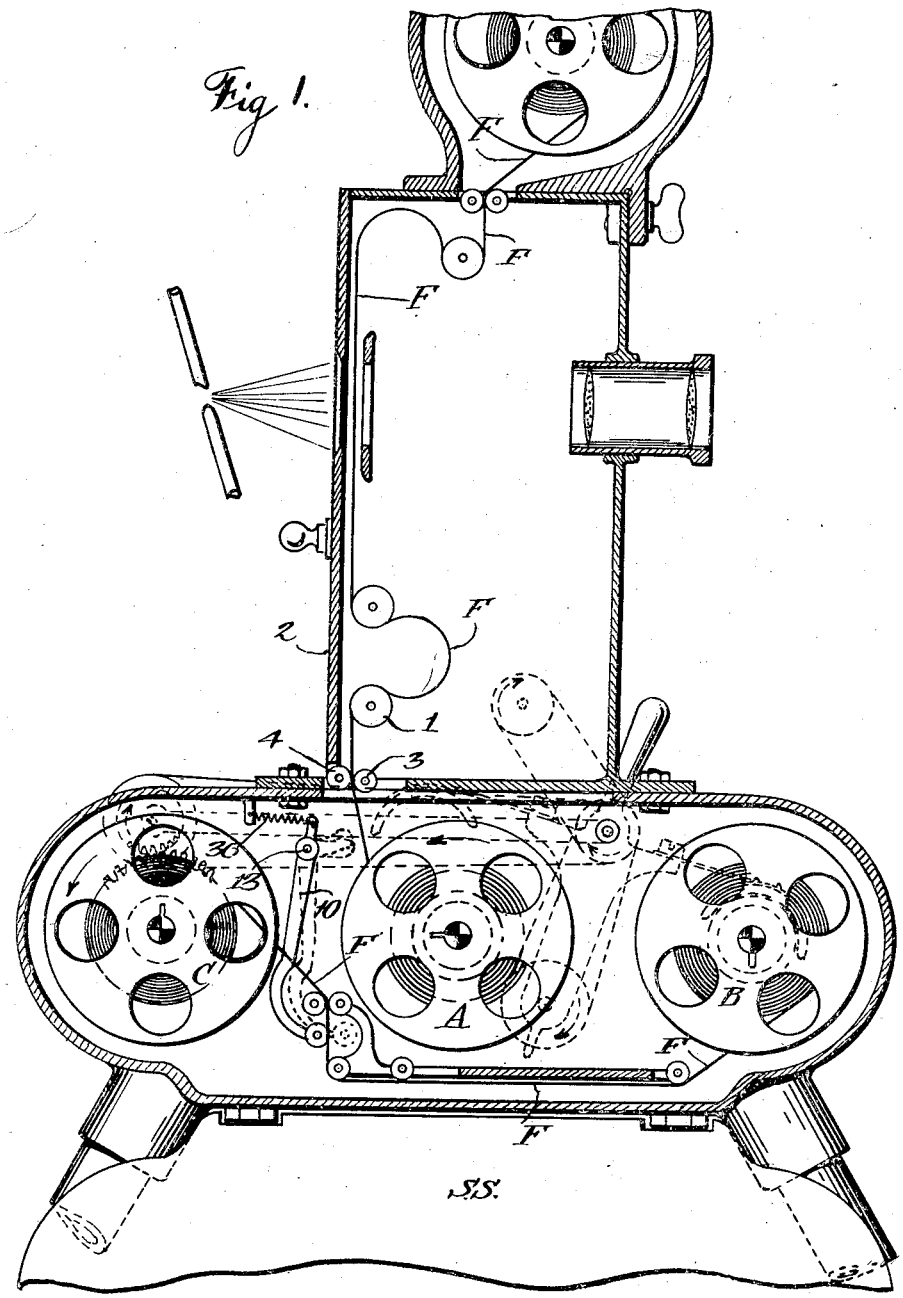
Figure 1 is a sectional view through a motion picture machine in operation with my device.

In this device, the film F is received from the lower sprocket 1 mounted in motion picture machine frame 2, passing between two rollers 3 and 4 on to reel A as shown in Fig. 1. This reel is now frictionally driven until this film has all been taken up and a successive film is received in the motion picture machine. This succeeding film is threaded on to reel B, which is now frictionally driven, as shown in Fig. 2. The film on reel A is delivered to reel C, passing rollers 5, 6, 7, 8 and 9. The roller 9 is mounted in a swingable arm 10 controlling the driving engagement of the reel C, which is preferably positively driven, as it is merely a rewinding reel. It is necessary to wind the film tightly on reel C. I therefore provide a friction brake 11 to the pulley 12 mounted on common axis with reel B. Now, as the reel C is preferably positively driven, it will have received all the film from reel A long before reel B, which receives the film slowly from motion picture machine (Fig. 2). I therefore provide an automatic device, controlled by the film, to disengage the driving members for reel C. This is accomplished in simple manner. After film F has left rollers 7 and 8, the roller 9 falls in between rollers 6 and 7, which the film heretofore prevented.

Arm 10 is mounted on shaft 13. On the other end of shaft 13 is mounted a small lever 14, which, when moved by actions of arm 10, will lift a swingable gear carrying arm 15, and therefore disconnecting gear 16 from gear 17 on reel shaft 18. The reel C is always ready for exhibition. In the next operation, reel C will receive film from reel B on shaft 19. Reel C is on shaft 18. Shafts 19 and 20 are the shafts for the so-called take-up reels, and carry on one end friction pulleys 12 and 22 and are driven one at a time by another pulley 23, which pulley is mounted in arm 24 and driven by pulleys and belt 27. Arm 24 is pivotally mounted on 25 and 26 and shaft 28. Friction brakes 11 and 11ª are also fastened to arm 24 with screws 29 and 29ª. Pulley 26 receives motion through belt 31 from pulley 30 in the motion picture machine. Pulley 26 also drives pulley 32 by means of a belt 32ª. The center of all driving connections is pivot 28. The arm 24 by handle 24ª, can be shifted to bring the pulley 23 in driving contact with either pulley 12 or 22 alternately. The brakes 11 and 11ᵃ are operated likewise and simultaneously. Between the rollers 6 and 5ᵃ a channel is formed by walls R and S to protect the film in the delivery from one reel to the other. 35 and 35ᵃ are notch springs to keep arm 24 in proper position. 36 is a tension spring acting on arm 10. It will also be noticed that the reels A and B never need to be removed. Only the reel C is taken out ready for exhibition.

The casing S in which the entire device is mounted is closed with a door S S in front (shown only in part) to make the entire apparatus fireproof. All reels are absolutely in the same alinement and directly below the optical axis, and therefore no twisting in the film is necessary and no shifting of the reel supports or reels, any more than under ordinary conditions where rewinding is not accomplished, and all the film is carried below the focal line free from any fire danger. The device can be considerably changed without altering its principle. The description and drawings show an easily understood form of the apparatus, but I do in nowise limit myself to its exact illustrations of my drawings and description and no great attention has been given to its technique.

What I claim as my invention is:

1. In combination with a motion picture machine, at least three film reels mounted on shafts located below the optical axis of the motion picture machine, a supporting frame for the reel shafts, means for rotating one of said shafts, and means for coincidently rotating either of the other of said shafts.

2. In combination with a motion picture machine, at least three film reels mounted on shafts located below the optical axis of the motion picture machine, a supporting frame for the reel shafts, means for rotating one of said shafts, and means operated thereby for rotating either of the other of said shafts.

3. The combination with a reversing reel and a plurality of take up reels, a source of power, a pivotally mounted arm, and means controlled by said arm for transmitting power to either one of said take up reels and for coincidently applying a brake to the other of said take up reels.

4. The combination with a reversing reel and a plurality of take up reels, a source of power, a pivotally mounted arm, and a friction pulley controlled by said arm for transmitting power to either one of said take up reels.

5. The combination with a reversing reel and a plurality of take up reels, a source of power, a pivotally mounted arm, and a friction pulley controlled by said arm for transmitting power to either one of said take up reels, and means operated thereby for applying a brake to the other of said take up reels.

6. In a motion picture machine the combination with a reversing reel for the film, a plurality of take up reels to take up the film after it has passed through the motion picture machine, means for passing the film from the motion picture machine to any one of said take up reels and means for coincidently feeding the film from a wound take up reel to said reversing reel.

7. In a motion picture machine, a lower film receiving box containing a reversing reel and two take up reels, shiftably mounted driving means for said take up reels, shiftably mounted retarding means and a common lever for controlling said driving means and retarding means.

8. In a motion picture machine, a lower film receiving box containing a reversing reel and two take up reels, shiftably mounted driving means for said take up reels, shiftably mounted retarding means and a common lever for controlling said driving means and retarding means.

9. In combination with a motion picture machine, a film winding device consisting of three reels mounted below the motion picture machine, a common supporting frame for said reels, two of said reels having driving means arranged to supply rotary power to them alternately, and one of them to receive rotary power controlled by the film as the film passes from one of the two aforementioned reels to the last mentioned reel.

10. In combination with a motion picture machine, a lower take up device, consisting of three reels, shafts for the reels, a support for the shafts, shiftable driving connections for the reels, the shiftable driving connection carrying a brake member to retard the reel disconnected from the driving power, and a driving connection for one of the reels, under the control of the film adapted to disengage the driving power automatically when the supply of film ceases.

Signed at New York city, New York, this 23rd day of March, 1915.

CHARLES UEBELMESSER.

Witnesses:
ALBERT H. T. BANZHAF,
FRED PERKINS.